US007644167B2

(12) United States Patent
Lee et al.

(10) Patent No.: US 7,644,167 B2
(45) Date of Patent: Jan. 5, 2010

(54) IDENTIFYING A SERVICE NODE IN A NETWORK

(75) Inventors: Sung-Ju Lee, Los Altos, CA (US); Sujata Banerjee, Sunnyvale, CA (US); Puneet Sharma, Palo Alto, CA (US); Sujoy Basu, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 823 days.

(21) Appl. No.: 10/960,605

(22) Filed: Oct. 8, 2004

(65) Prior Publication Data

US 2005/0198328 A1 Sep. 8, 2005

Related U.S. Application Data

(63) Continuation-in-part of application No. 10/767,285, filed on Jan. 30, 2004.

(51) Int. Cl.
*G06F 15/16* (2006.01)
(52) U.S. Cl. .................. 709/229; 709/217; 709/225; 709/226
(58) Field of Classification Search .......... 709/200, 709/203, 217–219, 223, 225, 226, 227–229
See application file for complete search history.

(56) References Cited

U.S. PATENT DOCUMENTS

| | | | |
|---|---|---|---|
| 6,327,622 B1 * | 12/2001 | Jindal et al. ............ | 709/228 |
| 6,408,290 B1 * | 6/2002 | Thiesson et al. ........ | 706/52 |
| 6,671,259 B1 * | 12/2003 | He et al. ................ | 370/238 |
| 6,728,748 B1 * | 4/2004 | Mangipudi et al. ..... | 718/105 |
| 6,795,858 B1 * | 9/2004 | Jain et al. .............. | 709/226 |
| 6,854,013 B2 * | 2/2005 | Cable et al. ............ | 709/226 |
| 6,983,326 B1 * | 1/2006 | Vigue et al. ........... | 709/229 |
| 7,185,077 B1 * | 2/2007 | O'Toole et al. ........ | 709/223 |
| 7,313,656 B1 * | 12/2007 | Harvey .................. | 711/137 |
| 2003/0147386 A1 | 8/2003 | Zhang et al. | |

OTHER PUBLICATIONS

Banerjee, S et al—"Service Adaptive Multicast For Media Distribution Networks"—Proc 3rd IEEE Workshop on Internet Applications—Jun. 23, 2003.
Shen, B et al—"Semantic-Enhanced Distribution & Adaptation Networks"—IEEE Int'l Conf on Multimedia and Expo—vol. 2—Jun. 27, 2004.
Zhichen, X et al—"Building Topology-Aware Overlays Using Global Soft-State"—Proc Int'l Conf on Distributed Computing Systems—Conf 23—May 19, 2003.
Calvert, K. et al., "Modeling Internet Topology", IEEE Communications Magazine, vol. 35, No. 6, p. 160-163, Jun. 1997.
Castro, M. et al., "Scribe: A Large-Scale and Decentralized Application-Level Multi-Cast Infrastructure", IEEE Journal on Selected Areas in Communications, vol. 20, No. 8, pg.

(Continued)

*Primary Examiner*—Saleh Najjar
*Assistant Examiner*—Faruk Hamza

(57) ABSTRACT

A request is received from a first node in a network. The request includes a request for a service node operable to provide a desired service. At least one service node is identified that is operable to provide the desired service based at least on location information for the first node.

12 Claims, 14 Drawing Sheets

OTHER PUBLICATIONS

Chen, B. et al., "L+: Scalable Landmark Routing and Address Lookup for Multi-Hop Wireless Networks", MIT LCS, Tech, Mar. 2002.

Chu, Y. et al., "A Case For End System Multicast", IEEE Journal on Selected Areas in Communications, vol. 20, No. 8, p. 1456-1471, Oct. 2002.

Duan, Z. et al., "Service Overlay Networks: SLAs, QoS and Bandwidth Provisioning",ICNP, Nov. 2002, p. 334-343.

Francis, P. et al., "IDMaps: A Global Internet Host Distance Estimation Service", IEEE/ACM Transactions on Networking, vol. 9, No. 5, p. 525-540, Oct. 2001.

Fu, X. et al., "CANS: Composable, Adaptive Network Services Infrastructure", USITS , San Francisco, CA, Mar. 2001.

Gummadi, K.P. et al., "King: Estimating Latency Between Arbitrary Internet End Hosts", IMW, France, Nov. 2002, p. 5-18.

Ng, T.S.E. et al., "Predicting Internet Network Distance With Coordinates-Based Approaches", IEEE Infocom, NY, Jun. 2002.

Pei, G. et al., "LANMAR: Landmark Routing for Large Scale Wireless Ad Hoc Networks with Group Mobility", MobiHoc, Boston, MA, Aug. 2000, p. 11-18.

"Performance Measurement Tools Taxonomy", http://www.caida.org/tools/taxonomy/performance.xml, Oct. 2004.

Ratnasamy, S. et al., "Topologically-Aware Overlay Construction and Server Selection", IEEE Infocom, NY, Jun. 2002.

Theilmann, W. et al., "Dynamic Distance Maps of the Internet", IEEE Infocom, Tel Aviv, Isreal, Mar. 2000, p. 275-284.

"Tools for Bandwidth Estimation", http://www.icir.org/models/tools.html, Mar. 2004.

Tsuchiya, P.F., "The Landmark Hierarchy: A New Hierarchy For Routing In Very Large Networks", SIGCOMM, Stanford, CA, Aug. 1988, p. 35-42.

Xu, D. et al., "Finding Service Paths In A Media Service Proxy Network", MMCN, San Jose, CA, Jan. 2002.

Zhao, B.Y. et al., "Brocade: Landmark Routing on Overlay Networks", IPTPS 2002, Cambridge, MA, Mar. 2002.

Zhuang, S.Q. et al., "Bayeux: An Architecture for Scalable and Fault-Tolerant Wide-Area Data Dissemination", NOSSDAV, Port Jefferson, NY, Jun. 2001.

* cited by examiner

IDENTIFYING A SERVICE NODE IN A NETWORK

RELATED APPLICATION

This application is a continuation-in-part of co-pending U.S. patent application Ser. No. 10/767,285, filed Jan. 30, 2004, and entitled "Selecting Nodes Close To Another Node In A Network Using Location Information For The Nodes" by Zhichen Xu et al.

TECHNICAL FIELD

This invention relates generally to networks. More particularly, the invention relates to identifying a service node in a network.

BACKGROUND

The Internet, as it has grown considerably in size and popularity, is being used to provide various services and applications to users. Diverse applications, such as streaming a short movie demonstrating how to assemble a piece of furniture, taking a virtual tour of a real estate property or a scenic spot, watching a live performance of an artist, and participating in a networked multi-user computer game or conference, are all available to users via the Internet.

An important trend is that users are no longer satisfied with receiving services that are targeted at mass audiences. Users are demanding services that are tailored to their individual needs. With the proliferation of personalized services, an important challenge facing future network infrastructure is balancing the tradeoffs between providing individualized services to each user and making efficient use of network resources.

A fundamental challenge in effectively utilizing network resources and services is efficiently and quickly locating desired resources/services in large networks, such as the Internet. For example, a user may generate a query for finding particular media content available in the network. Location and distance estimation techniques may be used to find the closest cache or proxy in the network that provides the desired data or service, such as the desired media content.

Landmark clustering is a known location and distance estimation technique for determining a distance to a node in a network. Landmark clustering was introduced for routing in large networks. A node's physical location in a network is estimated by determining the node's distance to a common set of landmark nodes in the network. Landmark clustering assumes that if two nodes have similar distances (e.g., measured latencies) to the landmark nodes, the two nodes are likely to be close to each other. Routers store the estimated physical locations of the nodes and use the position information for routing to the closest node.

FIG. 13 illustrates estimating physical position for the nodes 1310 and 1320 in the network 1300 using landmark clustering. The client nodes 1310 and 1320 determine their distances to the landmark nodes L1301 and L1302. Because the nodes 1310 and 1320 have similar distances to the landmark nodes L1301 and L1302, the nodes 1310 and 1320 are determined to be close to each other.

Landmark clustering is an efficient technique for determining general location information for nodes. However, current landmark clustering techniques tend to result in false clustering, where nodes that are far away in network distance are clustered near each other. That is nodes that are far away from landmark nodes tend be estimated as having locations near each other when in fact they are located at substantial distances from each other. Secondly, landmark clustering is a coarse-grained approximation and is not very effective in differentiating between nodes that are relatively close in distance.

SUMMARY

According to an embodiment, a method of identifying at least one service node in a network to provide a desired service for a first node includes receiving a request from the first node for a service node operable to provide a desired service, and identifying at least one service node operable to provide the desired service based at least on location information for the first node.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

Figure 1:
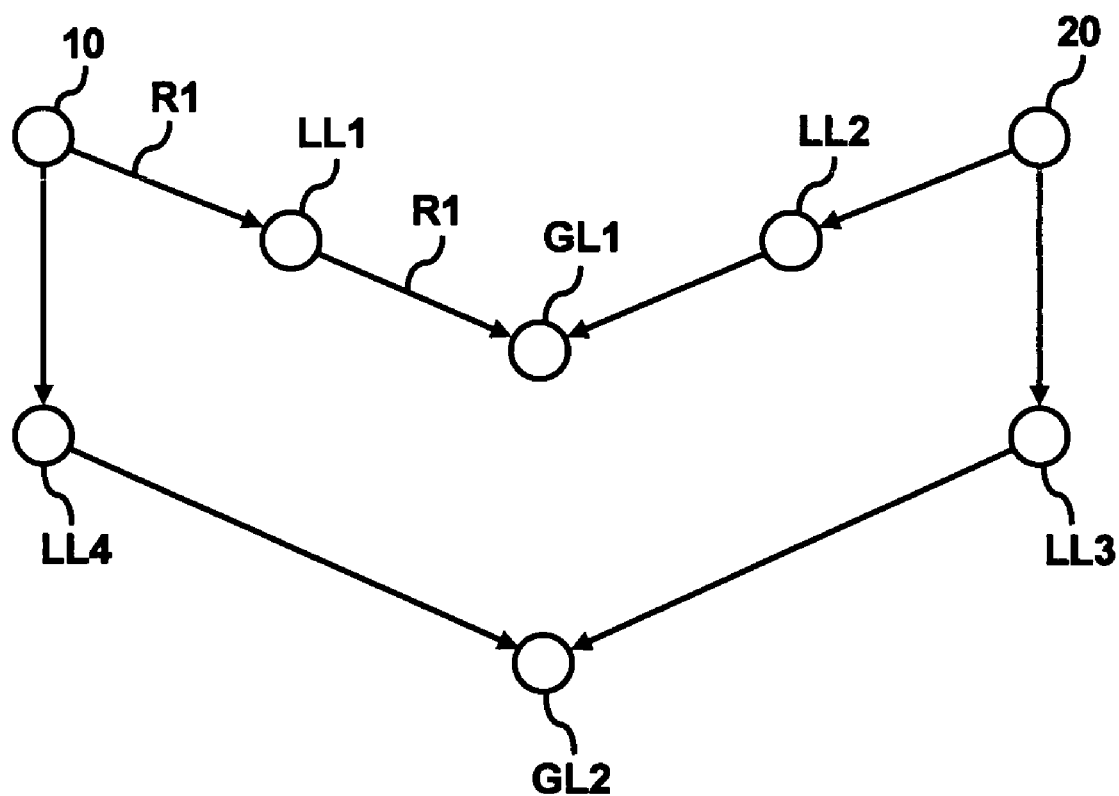
FIG. 1 illustrates using global landmark nodes and local landmark nodes in a network to generate location information according to an embodiment.

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, an enhanced landmark clustering technique is used to estimate physical locations of nodes in a network. A node is any device that may send and/or receive messages from another device via the network. A physical location of a node, also referred to herein as the node's location in the network, is the node's location in the network relative to other nodes in the network. For example, location information for the node may be determined by measuring distances to other nodes in the network, such as global landmark nodes and local landmark nodes that are proximally located to the node. The location information may be used as an estimation of the node's physical location in the network. Distance to a node, for example, may be measured using a network metric such as round-trip-time or network hops. Distances between nodes and location information for nodes may not be the same as geographical distances between nodes and geographical locations of the nodes, because distances are measured in terms of a network metric, such as round-trip-time or network hops, and not measured in terms of a geographical distance metric, such as kilometers or miles.

Global landmark nodes and local landmark nodes may be randomly selected from the nodes in a network. Almost any node in the network may be selected to be a global landmark node or a local landmark node. The number of nodes selected to be local landmark nodes and global landmark nodes is generally much smaller than the total number of nodes in the network. Also, the total number of global landmark nodes in the network is generally smaller than the number of local landmark nodes. The number of global and local landmark nodes used in the network may depend on the desired accuracy of the location information. To minimize network traffic local landmark nodes may be strategically placed in the network, such as near gateway routers. For example, routers encountered by a message from the node en route to a global landmark can be used as local landmark nodes.

As described above, location information for a node may be determined by measuring distances to global landmark nodes and local landmark nodes that are proximally located to the node. In one embodiment, the node measures distances to each of the global landmark nodes and the proximally located local landmark nodes in the network to determine the node's location information. In one example, a proximally located local landmark mark node is generally closer to the node than at least one of the global landmark nodes. For example, a local landmark node may be on a routing path between the node and a global landmark node. In this example, the distance to the local landmark nodes can be obtained with little or no added messaging overhead if these local landmark nodes can respond to measurement traffic, such as a probe packet for measuring round-trip-time. That is additional distance measurement traffic to the local landmark nodes need not be generated, because this example may utilize a probe packet being transmitted to a global landmark node to measure distances to local landmark nodes encountered en route to the global landmark node. In another example, a local landmark node may be proximally located to a node if the local landmark node is within a predetermined distance to the node. In this example, a node may identify local landmark nodes in proximity to the node using a global information table, and then measure distances to the identified local landmark nodes. Thus, local landmark nodes, which may not be on a routing path to a global landmark node but which may still be useful for accurately determining location information for the node, can be used.

Compared with conventional landmark clustering techniques, the landmark techniques according to the embodiments provide a physical location of a node that can be accurately estimated by determining distances to a relatively small number of global and local landmark nodes. Also, the local landmark nodes provide accurate information of the local network characteristics. Thus, optimal-paths for routing based on local network-characteristics may be selected.

The location information for the nodes in the network may be used for a variety of applications. According to an embodiment, location information is used to find a service node providing a desired service for a node in the network. A service is a function that operates on an input and produces an output. Examples of services include transcoding, encryption, image repair and analysis, error correction, converting content into different languages, etc. Some services are reversible, such that the output of the initial service may be converted back to the input. For example, an encryption service may also provide de-encryption. Service nodes provide services to other nodes. A node is any device that may send and/or receive messages via the network. Examples of nodes include routers, servers, and end-user devices, such as PDA's, personal computers, laptops, and cellular phones.

A node may desire to receive a service, and thus may need to identify a service node that can provide the desired service. The location information for the node is used to identify one or more service nodes that are operable to provide the desired service and that are physically close to the node. Physically close nodes refers to nodes that are physically close in the network, such as determined using the landmark vectors for each node. For example, nodes having landmark vectors with similarities that are greater than a threshold may be considered physically close. It will be apparent to one of ordinary skill in the art that instead of landmark vectors, other types of location proximity techniques may be used to determine location information, which may then be used to identify an initial set of service nodes in close proximity to the node requesting the service. The location information may be used to approximate bandwidth between the node requesting the service and the service nodes. For example, it is assumed that the closer the nodes are to each other, the higher is the available bandwidth between the nodes. Also, after the initial set of service nodes are identified, bandwidth measurements may be performed to identify a service node having enough bandwidth to satisfy the bandwidth requirement for a desired service.

If a plurality of service nodes operable to provide the desired service are identified, a clustering algorithm may be used to reduce or rank the service nodes based on how close each service node is to the node. For example, the clustering algorithm uses the location information for the node and the service nodes to rank the service nodes, where the highest rank service node is closest to the node. The list of ranked, service nodes are transmitted to the node requesting the service, and one of the service nodes is selected to provide the service. Selecting one of the service nodes may include measuring bandwidth between each of the service nodes and the node requesting the service. For example, the minimum bandwidth required for providing the service is determined. Then, a service node is selected wherein the available bandwidth is greater than the minimum bandwidth required for providing the service.

FIG. 1 illustrates an example of using global landmark nodes and local landmark nodes in a network to generate location information. Location information is generated for nodes 10 and 20 in the network 100 by measuring distance to global landmark nodes and local landmark nodes in proximity to the nodes 10 and 20. For example, for node 10 distances are measured to the global landmarks GL1 and GL2. Distances are also measured to the local landmark nodes LL1 and LL2. Distance to a node may be measured using a known network metric, such as round-trip-time (RTT) or network hops. For example, the node 10 may transmit a probe packet to the global landmark node GL1 and measure RTT of the probe packet to determine the distance to the global landmark node GL1. A probe packet, for example, is a packet generated by node to measure one or more predetermined network metrics, such as RTT.

A landmark vector representing the location information for the node 10 is generated including the distances to the global landmark nodes GL1 and GL2 and the local landmark nodes LL1 and LL4. The landmark vector for the node 10 may be represented as <{GL1, d(n, GL1)}, {LL1, d(n, LL1)}, {GL2, d(n, GL2)}, {LL4, d(n, LL4)}>, where d is the distance between the nodes n and the respective landmark node and n represents the node for which location information is being generated.

Similarly, location information may be generated for the node 20. For example, distances are measured to the global landmarks GL1 and GL2. Distances are also measured to the local landmark nodes LL2 and LL3. A landmark vector representing the location information for the node 20 is generated including the distances to the global landmark nodes GL1 and GL2 and the local landmark nodes LL2 and LL3. The landmark vector for the node may be represented as <{GL1, d(n, GL1)}, {LL2, d(n, LL2)}, {GL2, d(n, GL2)}, {LL3, d(n, LL3)}>.

A location estimation technique that only considers distance to the global landmarks GL1 and GL2 may conclude that nodes 10 and 20 are in close proximity in the network 100, because the nodes 10 and 20 have similar distances to the global landmark nodes GL1 and GL2. These types of inaccuracies are known as false clustering. By accounting for the distances to the local landmark nodes LL1-LL4, false clustering is minimized and a more accurate estimation of the location of the nodes 10 and 20 is determined.

The network 100 may include many local landmark nodes and global landmark nodes, not shown. The number of nodes selected to be local landmark nodes and global landmark nodes is generally much smaller than the total number of nodes in the network. Also, the total number of global landmark nodes in the network 100 is generally smaller than the number of local landmark nodes. The number of global and local landmark nodes used in the network 100 may depend on the desired accuracy of the location information. Simulations have shown that a relatively small number of global landmarks are needed, for example, 15 global landmark nodes for a network of 10,000 nodes, to generate accurate location information. Almost any node in the network 100 may be chosen to be a global landmark node or a local landmark node. For example, a predetermined number of nodes in the network may be randomly selected to be global landmark nodes and local landmark nodes, whereby the number of global landmark nodes is smaller than the number of local landmark nodes. To minimize network traffic local landmark nodes may be strategically placed in the network 100, such as near gateway routers. For example, nodes near gateway routers may be selected to be local landmark nodes.

As described above, the nodes 10 and 20 measure distance to local landmark nodes proximally located to the nodes 10 and 20. In one embodiment, local landmark nodes are proximally located to a node if the local landmark nodes are on a routing path to a global node. For example, node 10 transmits a probe packet to the global landmark node GL1. The probe packet encounters local landmark node LL1, because it is on the routing path R1 to the global landmark node GL1. The local landmark node LL1 transmits and acknowledge (ACK) message back to the node 10. The node 10 determines distance to the local landmark node LL1, for example, using the RTT of the probe packet and the ACK message. Also, to minimize network traffic, a probe packet may keep track of the number of local landmark nodes that it has encountered, for example, by updating a field in a packet header similar to a time-to-live field. If a local landmark node receives a probe packet that has already encountered a predetermined number of local landmark nodes, the local landmark node simply forwards the packet without transmitting an ACK message.

In another embodiment, each of the local landmark nodes measures its distance to global landmark nodes to obtain its own landmark vector. These landmark vectors are stored in a global information table that is stored in the nodes in the network 100. The global information table is queried to identify local landmark nodes in proximity to a node. For example, the node 10 queries the global information table to identify local landmark nodes, such as the local landmark nodes LL1 and LL4 in proximity with the node 10. This may include identifying local landmark nodes having landmark vectors with a predetermined similarity to the node 10, wherein the predetermined similarity is related to a distance threshold between the node and the landmark node. Then, the node 10 determines distance to the local landmark nodes LL1 and LL4. Thus, a local landmark node need not be in a routing path to a global landmark node to be considered proximally located to the node 10.

Each node in the network 100 may generate location information, such as landmark vectors, by determining distances to the global landmark nodes and proximally located local landmark nodes. Each node stores its location information in a global information table. Thus, the global information table may include landmark vectors for substantially all the nodes in the network.

According to an embodiment, the global information table is implemented using a distributed hash table (DHT) overlay network. DHT overlay networks are logical representations of an underlying physical network, such as the network 100, which provide, among other types of functionality, data placement, information retrieval, and routing. DHT overlay networks have several desirable properties, such as scalability, fault-tolerance, and low management cost. Some examples of DHT overlay networks that may be used in the embodiments of the invention include content-addressable-network (CAN), PASTRY, CHORD, and expressway routing CAN (eCAN), which is a hierarchical version of CAN. The eCAN overlay network is further described in U.S. patent application Ser. No. 10/231,184, entitled, "Expressway Routing Among Peers", filed on Aug. 29, 2002, having a common assignee as the present application, and is hereby incorporated by reference in its entirety.

A DHT overlay network provides a hash table abstraction that maps keys to values. For example, data is represented in an overlay network as a (key, value) pair, such as (K1, V1). K1 is deterministically mapped to a point P in the overlay network using a hash function, e.g., P=h(K1). An example of a hash function is checksum or a space filling curve when hashing to spaces of different dimensions. The key value pair (K1, V1) is then stored at the point P in the overlay network, i.e., at the node owning the zone where point P lies. The same hash function is used to retrieve data. The hash function is also used for retrieving data from the DHT overlay network. For example, the hash function is used to calculate the point P from K1. Then the data is retrieved from the point P.

In one example, the global information table is stored in a CAN overlay network, however other types of DHT overlay networks may be used. In this example, a landmark vector or a portion of the landmark vector for a node is used as a key to identify a location in the DHT overlay network for storing information about the node. By using the landmark vector as a key, information about nodes physically close to each other in the underlying physical network are stored close to each other in the DHT overlay network, resulting in a minimal amount of traffic being generated when identifying a set of nodes close to a given node in the network.

Figure 2:
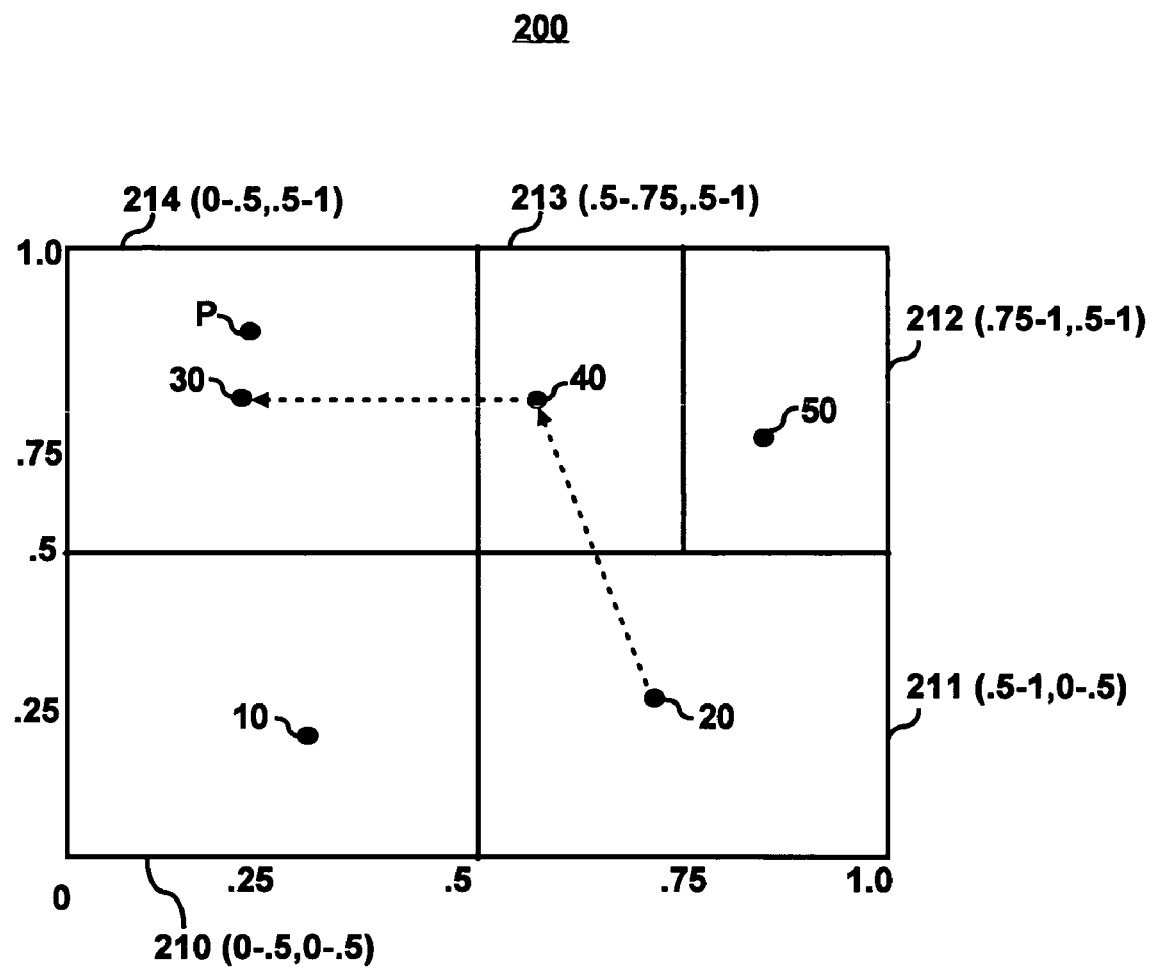
FIG. 2 illustrates a 2-dimensional CAN overlay network for the network shown in FIG. 1, according to an embodiment.

FIG. 2 illustrates an example of a 2-dimensional CAN overlay network 200 shown in FIG. 2, which is a logical representation of the underlying physical network 100. The nodes 30-50 shown in FIG. 2 are not shown in the network 100 shown in FIG. 1, but the nodes 30-50 may also be in the network 100. A CAN overlay network logically represents the underlying physical network using a d-dimensional Cartesian coordinate space on a d-torus. FIG. 2 illustrates a 2-dimensional [0,1]×[0,1] Cartesian coordinate space in the overlay network 200. The coordinates for the zones 210-214 are shown. The Cartesian space is partitioned into CAN zones 210-214 owned by nodes 10-50, respectively. Each DHT node in the overlay network owns a zone. The nodes 30 and 20 are neighbor nodes to the node 10 and the nodes 40-50 and 10 are neighbor nodes to the node 20. Two nodes are neighbors if their zones overlap along d-1 dimensions and abut along one dimension. For example, the zones 210 and 214 abut along [0,0.5]×[0.5,0]. The zones 210 and 213 are not neighbor zones because these zones do not abut along a dimension.

The nodes 10-50 each maintain a coordinate routing table that may include the IP address and the zone coordinates in the overlay network of each of its immediate neighbors. The routing table is used for routing from a source node to a destination node through neighboring nodes in the DHT overlay network 200. Assume the node 20 is retrieving data from a point P in the zone 214 owned by the node 30. Because the point P is not in the zone 211 or any of the neighboring zones of the zone 211, the request for data is routed through a neighboring zone, such as the zone 213 owned by the node 40 to the node 30 owning the zone 214 where point P lies to retrieve the data. Thus, a CAN message includes destination coordinates, such as the coordinates for the point P determined using the hash function, for routing.

Figure 3:
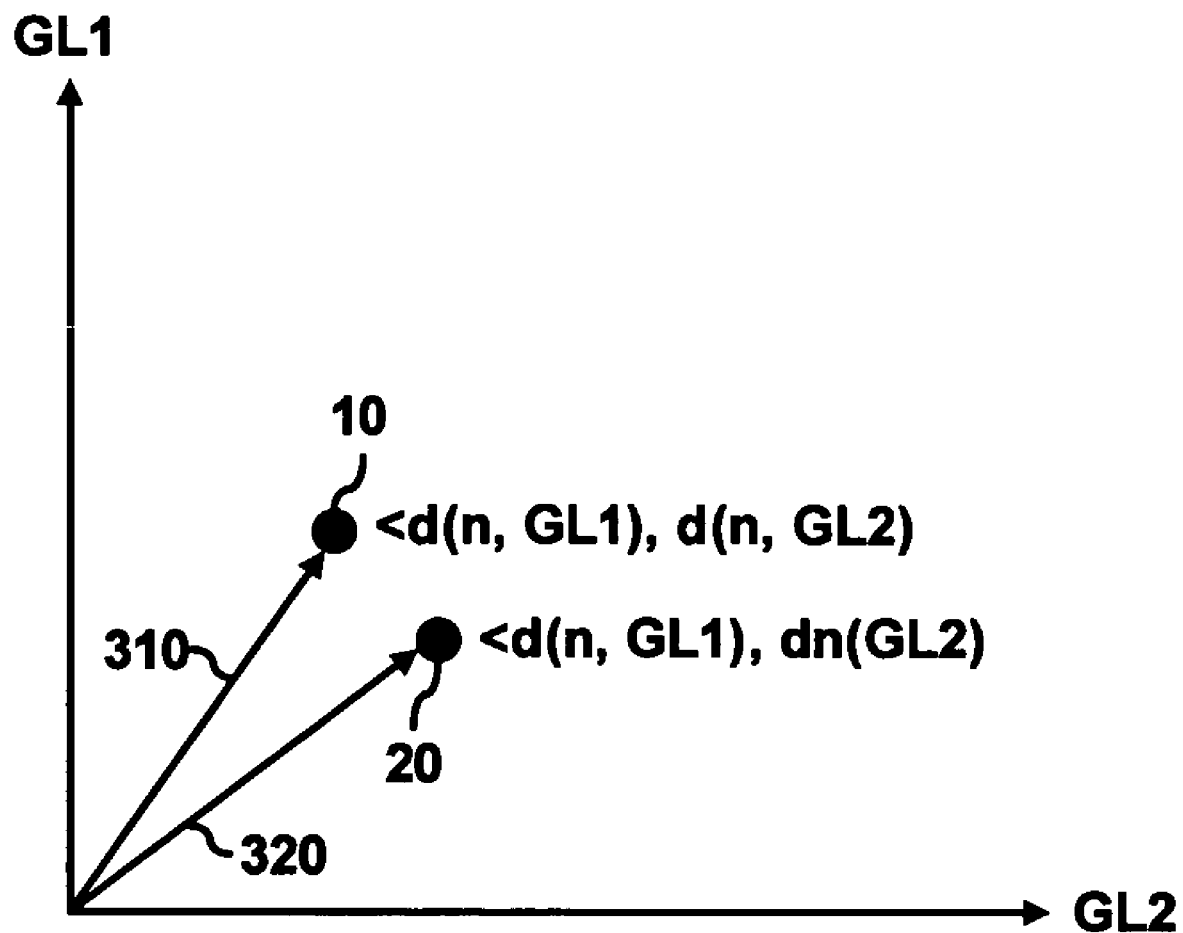
FIG. 3 illustrates a landmark space including landmark vectors, according to an embodiment.

The global information table includes information about the nodes in the network 100, and the information is stored in the nodes in the DHT overlay network 200. To store information about a node in the global information table, the landmark vector for the node, which includes distances to the global landmark nodes in the network and distances to proximally located local landmark nodes, is used as a key to identify a location in the DHT overlay network for storing information about the node. By using the landmark vector or a portion of the landmark vector, such as the distances to the global landmark nodes, as a key, information about nodes physically close to each other in the network are stored close to each other in the DHT overlay network. FIG. 3 illustrates a landmark space 300 including landmark vectors 310 and 320 for the nodes 10 and 20. The landmark space 300 is a logical representation of a space for mapping the landmark vectors of the nodes in the network 100. The landmark space 300 is being shown to illustrate the mapping of the landmark vectors to locations in the DHT overlay network 200 for storing information in the global information table.

The global landmark portions of the landmark vectors for the nodes 10 and 20 are used to identify points in the landmark space 300 that are mapped to the DHT overlay network 100 for storing information in the global information table. The global landmark portion for the node 10 is <{GL1, d(n, GL1)}, {GL2, d(n, GL2)}>, where d is distance to the global landmark nodes from the node n and n is the node 10 or 20. Each node in the network 100 may be mapped to the landmark space using the global landmark portion of the respective landmark vector. Also, the landmark space 300 may be much greater than two dimensions. The number of dimensions may be equal to the number of global landmark nodes used in the network 100. The nodes 10 and 20 are positioned in the landmark space 300 at coordinates based on their landmark vectors. Thus, nodes close to each other in the landmark space 300 are close in the physical network 100.

Figure 4:
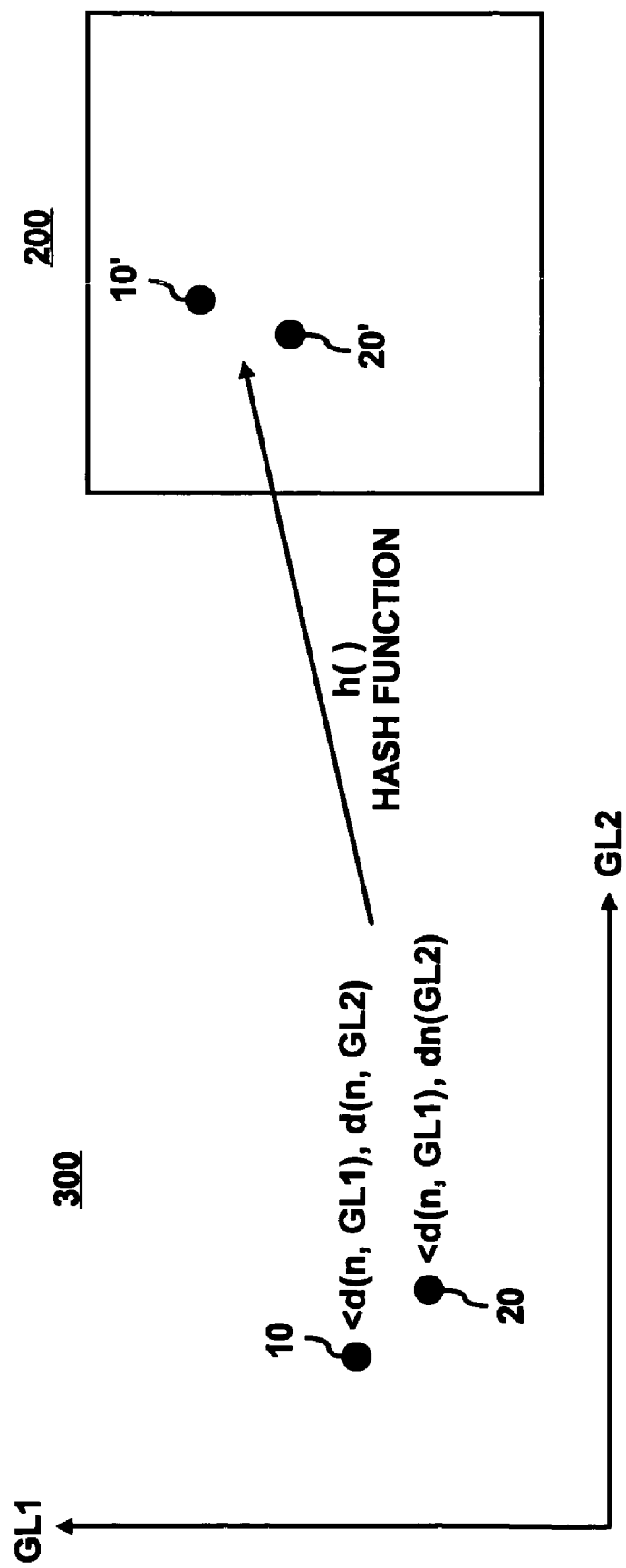
FIG. 4 illustrates using a hash function to translate points in the landmark space shown in FIG. 3 to an overlay network, such as shown in FIG. 2, according to an embodiment.

A hash function is used to translate physical node location information (e.g., landmark vectors) from the landmark space 300 to the overlay network 200, such that points close in the landmark space 300 are mapped to points that are close in the DHT overlay network 200. FIG. 4 illustrates using a hash function to translate the points for the nodes 10 and 20 in the landmark space 300 to the overlay network 200. The hash function is used to determine the points 10' and 20' in the overlay network 200 that correspond to the points in the landmark space 300 for the nodes 10 and 20. The information for the nodes 10 and 20 is stored in the nodes that own the zone where the points 10' and 20' are located. Thus, by hashing the global landmark portion of a landmark vector, a node in the overlay network 200 is identified for storing information in the global information table, such as the complete landmark vector and other information associated with the nodes. Thus, the global information table is stored among the nodes in the DHT overlay network 200. Using a DHT overlay network to store landmark vectors is further described in U.S. patent application Ser. No. 10/666,621, entitled "Utilizing Proximity Information in an Overlay Network" by Tang et al., having a common assignee with the present application, which is hereby incorporated by reference in its entirety.

In certain instances, the number of dimensions of the landmark space may be larger than the number of dimensions of the overlay network. A hash function comprising a space filling curve may be used to map points from the larger dimension space to the smaller dimension space, which is also described in the aforementioned patent application, U.S. patent application Ser. No. 10/666,621, incorporated by reference.

The location information for the nodes in the network 100, such as landmark vectors including distances to the global landmark nodes and proximally located local landmark nodes, may be used to identify a closest node for a given node. For example, referring to FIG. 1, node 10 may be a client node used by a user. The node 10 determines its landmark vector, including distances to the global landmark nodes and proximally located local landmark nodes. The node 10 submits a request to find a close node to the DHT overlay network 100. For example, the node 10 hashes the global portion of its landmark vector, such as the distances to the global landmark nodes GL1 and GL2, to identify a point in the DHT overlay network 200. The node 10 transmits the request to a node in the DHT overlay network 200 owning the zone where the identified point is located.

The DHT overlay network 100 selects a set of candidate nodes closest to the node 10. For example, assume the node 10 transmits the request to the node 50. The node 50 selects a set of candidate nodes closest to the node 10 using the global landmark portion of the landmark vector for the node 10. For example, the node 50 compares the global landmark portion of the landmark vector of the node 10 to the global landmark portions of the landmark vectors for the nodes stored in the global information table residing in the node 50. This may include landmark vectors for nodes in the zone 212 owned by the node 50 and neighbor nodes to the node 50.

One measure of similarity between the landmark vectors or the global portions of the landmark vectors is the cosine of the angle between two landmark vectors. Landmark vectors that are the most similar to the landmark vector of a node, for example the node 10, may be selected as a candidate node. The number of candidate nodes selected may be based on the desired accuracy for finding the closest node.

Using the complete landmark vectors of all the candidate nodes and the complete landmark vector of the node 10, the node 50 applies a clustering algorithm to identify a subset of the set of candidate nodes that are closest to the node 10. A clustering algorithm is any algorithm that may be used to identify a subset of values from an initial set of values based on predetermined characteristics, such as similarities between location information. Four examples of clustering algorithms, described below by way of example and not limitation, are min_sum, max_diff, order, and inner product.

The min_sum clustering algorithm assumes that if there are a sufficient number of landmark nodes, global and local, that two nodes n and c measure distances against, it is likely one of the landmark nodes, L, is located on a shortest path between the two nodes n and c, where n is a given node, such as the node 10, and c is a node in the initial set of candidate nodes determined to be close to the node 10. An example of the node L is the global landmark node GL1 located on the shortest path between the nodes 10 and 20.

For min_sum, the sum of dist(n, L) and dist(c, L) should be minimal. For the node n and its initial set of candidate nodes, represented as C, min_sum (n, C) is formally defined using equation 1 as follows:

$$\min_{c \in C: L \in L(n,c)}(\text{dist}(n, L) + \text{dist}(c, L)). \quad \text{Equation (1)}$$

In equation 1, C is the set of candidate nodes, c is an element of the set C, and L(n, c) is the common set of landmark nodes, global and local, that the nodes n and c have measured against. Using equation 1, nodes from the candidate nodes C are selected for the subset of top candidates closest to the node n if they have the smallest distance sums for dist(n, L)+dist(c, L). Similarly, the assumption behind max_diff is that if there are sufficient number of landmark nodes, global and local, that both n and c measure distances against, then there is a large likelihood that there exists a landmark node L such that c is on the shortest path from n to L or n is on the shortest path between c and L. In that case the ABS(dist(n, L)−dist(c, L)) may be used to identify a subset of the candidate nodes closest to the node n. The function ABS (x) returns the absolute value of x. Max_diff(n, C) is formally defined using equation 2 as follows:

$$\max_{c \in C: L \in L(n,c)} \text{ABS}(\text{dist}(n, L) - \text{dist}(c, L)). \quad \text{Equation (2)}$$

For order, which is another example of a clustering algorithm, an assumption is made that if two nodes have similar distances to a set of common nodes, then the two nodes are likely to be close to each other. Using the order clustering algorithm, a node measures its RTT to the global landmark nodes and sorts the global landmark nodes in increasing RTTs. Therefore, each node has an associated order of global landmark nodes. Nodes with the same or similar order of global landmark nodes are considered to be close to each other. This technique however, cannot differentiate between nodes with the same global landmark orders, and thus is prone to false clustering.

For the nodes n, c, and L, where L is an element of the set of landmark nodes, global or local, that is common to the landmark vectors of nodes n and c, represented as L e L(n, c), the order of global landmarks in the landmark vector for the node n is defined as the order of global landmark nodes in the sorted list of all nodes L(n, c) based on their distances to the node n. The order of global landmark nodes is similarly defined. Thus, the order(n, c) is defined in equation 3 as follows:

$$\min_{\Sigma L \in L(n,c)} \text{ABS}(\text{order}(L)n - \text{order}(L)c). \quad \text{Equation (3)}$$

The clustering algorithm inner_product assumes that if a landmark node is close to a node n, then that landmark node can give a better indication of the location of the node n in the network. For example, the landmark vector for the node 10 may be represented as <{GL1, d(n, GL1)}, {LL1, d(n, LL1)}, {GL2, d(n, GL2)}, {LL4, d(n, LL4)}>, where d is the distance between the nodes and n represents the node 10. If d(n, LL1) is shorter than d(n, LL4), then d(n, LL1) is given more weight by the inner_product clustering algorithm when comparing landmark vectors for the node 10 and the landmark vectors for the candidate nodes. The inner_product (n, c) is defined in equation 4 as follows:

$$\max_{\Sigma L \in L(n,c)}((1.0/(\text{dist}(n, L)^2)) \times ((1.0/(\text{dist}(c, L)^2))). \quad \text{Equation (4)}$$

The landmark clustering algorithms described above are examples of algorithms that may be used to identify a subset of the initial set of candidate nodes that are closest to a node n, such as the node 10 shown in FIG. 1. Other known clustering algorithms, such as k-means, principal component analysis, and latent semantic indexing, may be used to select the subset of candidate nodes.

After the subset of candidate nodes are identified, the subset of the candidate nodes, such as a list of the subset of nodes which may include the landmark vectors of the nodes in the subset, are transmitted to the node 10. The node 10 measures distances to each of the nodes in the subset and selects the node closest to the node 10. By using this technique, a node desiring to identify a closest node measures distances to a small number of landmark nodes. Also, the local landmark nodes provide accurate information of local network characteristics, which may be used to select optimal routing paths. In addition, after utilizing a clustering algorithm, a node measures distances to a small number of top candidate nodes identified using the clustering algorithm.

Figure 5:
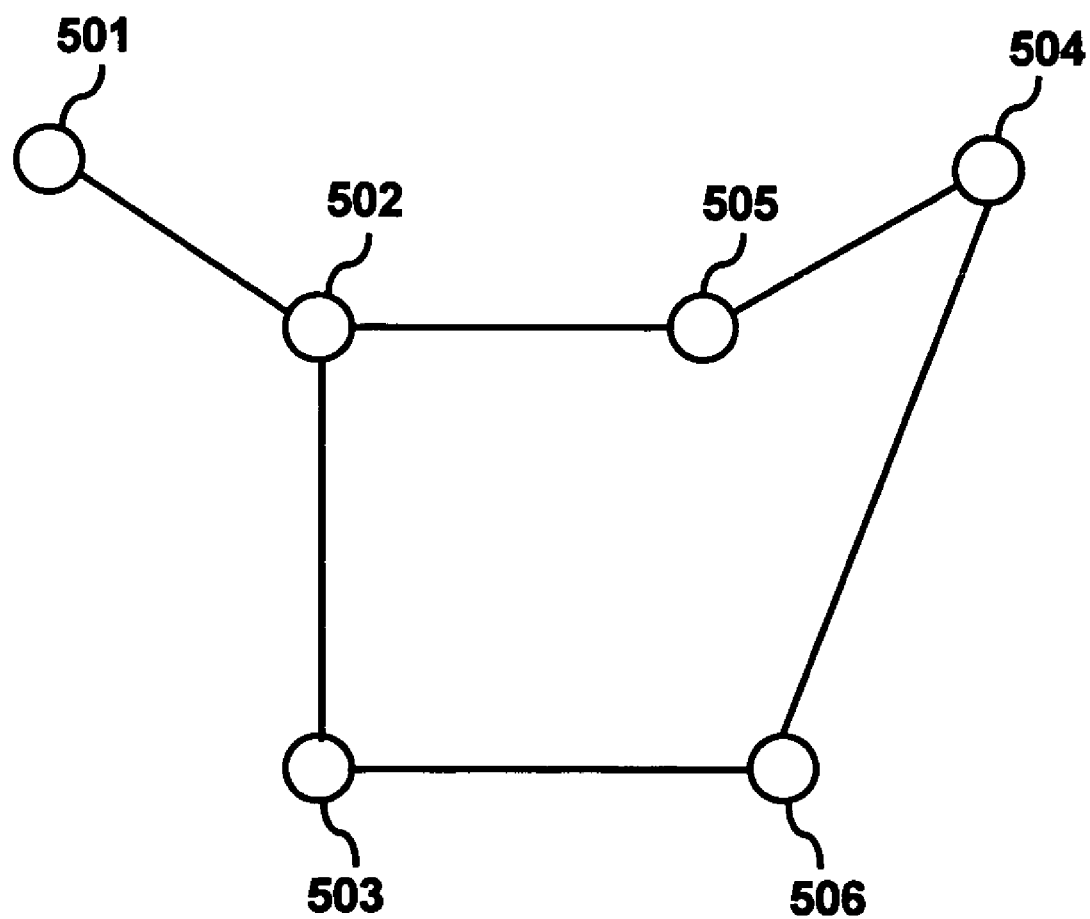
FIG. 5 illustrates another network, according to an embodiment.

One application for selecting the closest node to a given node is for identifying desired data or services provided by a node in a network. This is illustrated with respect to FIG. 5. FIG. 5 illustrates a network 500 including nodes 501-506. The network 500 is similar to the network 100 shown in FIG. 1 and may be represented as a DHT overlay network that stores the global information table. The node 506 provides content to users via the network 500. For example, the node 506 provides content in English. The nodes 503 and 504 may be service nodes that convert the content from the node 506 to German and make the content available to users in German. The service nodes are nodes that provide services to users. In this case, the service is providing content from the node 506 in German.

The node 501, for example, is used by a user that desires to view the content from the node 506 in German. The node 501 submits a request for the service to the DHT overlay network along with its landmark vector. The landmark vector is the location information for the node 501 and includes distances to global landmark nodes and local landmark nodes. Submitting the request to the overlay network, for example, includes the node 501 transmitting the request to the node 502. The node 502 may be the owner of the zone where the hashed landmark vector of the node 501 lies, and thus the request is transmitted to the node 502. The node 502 searches the global information table to identify a set of candidate nodes that meet the request. The request, in addition to including the type of service desired, may also include other measured or determined characteristics related to quality of service (QoS), such as bandwidth of a path connecting two nodes, current load of a node, and forward capacity of a node. In this example, the global information table, in addition to including landmark vectors for nodes in the network 500, stores information including services provided by nodes and QoS characteristics. It will be apparent to one of ordinary skill in the art that the global information table may be populated with other types of data that may aid in providing users with desired services.

The node 502 selects a set of service nodes that meet the request. The selection process includes identifying at least one service node from the global information table that can provide the desired service for the node 501. The global information table includes information such as the landmark vectors and services provided by nodes in the network. The global information table may be stored at one or a plurality of nodes in the network. When stored in a plurality of nodes, each of the plurality of nodes stores information for a set of nodes that are physically close in the network. For example, as described above, location information is stored by hashing the landmark vector or a portion of the landmark vector to identify a node in a DHT overlay network for storing the location information for the node hashing its landmark vector. As a result, the nodes in the DHT overlay network, in a distributed manner, store location information in a global information table for nodes physically close in the underlying network for the DHT overlay network. Hence, by the node 501 hashing its landmark vector to identify a location in the DHT overlay network for sending its request for a desired service, the node 501 is sending its request to a node in the DHT overlay network storing locations for nodes physically close to the node 501.

The node 502 receiving the request searches the global information table to identify one or more service nodes operable to provide the desired services. If more than one service node is identified, then a clustering algorithm, such as the min_sum, max_diff, order, and inner product clustering algorithms described above, may be used to provide a further estimation of how close each of the identified service nodes are to the node 501. The clustering algorithm may be used to rank each of the service nodes based on how close each service node is to the node 501. The node 502 transmits the list of ranked candidate nodes to the node 501.

If the global information table stored in the node 502 does not include a service node providing the desired service, then the search is expanded to include information from the global information table stored in other nodes, such as neighboring nodes to the node 502.

In this example, the identified service nodes operable to provide the desired service include the nodes 503 and 504. The node 501 selects one of the service nodes 503 or 504 for providing the desired service. All of the service nodes in the received list are operable to provide the desired service for the node 501, and the node 501 may select the closest service node for providing the desired service, such as determined using the clustering algorithm. Other factors may also be considered, such as available bandwidth. Available bandwidth is the bandwidth available for transmitting data in the network taking into consideration the network traffic. Certain content and services may require a minimum available bandwidth for transmitting data. The node 501 measures available bandwidth to each of the nodes 503 and 504, and selects one of the nodes having available bandwidth greater than the minimum bandwidth required for the service. The minimum bandwidth required for a service may be predetermined and may include the bandwidth required for transmitting data that is output by a service, such as translated or transcoded multimedia content. Other factors may also be considered, such as the closest candidate node, the current load of each candidate node, the forward capacity of a each candidate node, etc.

The networks 100 and 500 shown in FIGS. 1 and 5 are examples provided to illustrate the principles of the invention. It will be apparent to one of ordinary skill in the art that the embodiments of the invention may be practiced in much larger networks, such as tens of thousands of nodes. Furthermore, to improve the accuracy of the location information, a greater number of global and local landmark nodes may be used for determining location information for nodes.

Figure 6:
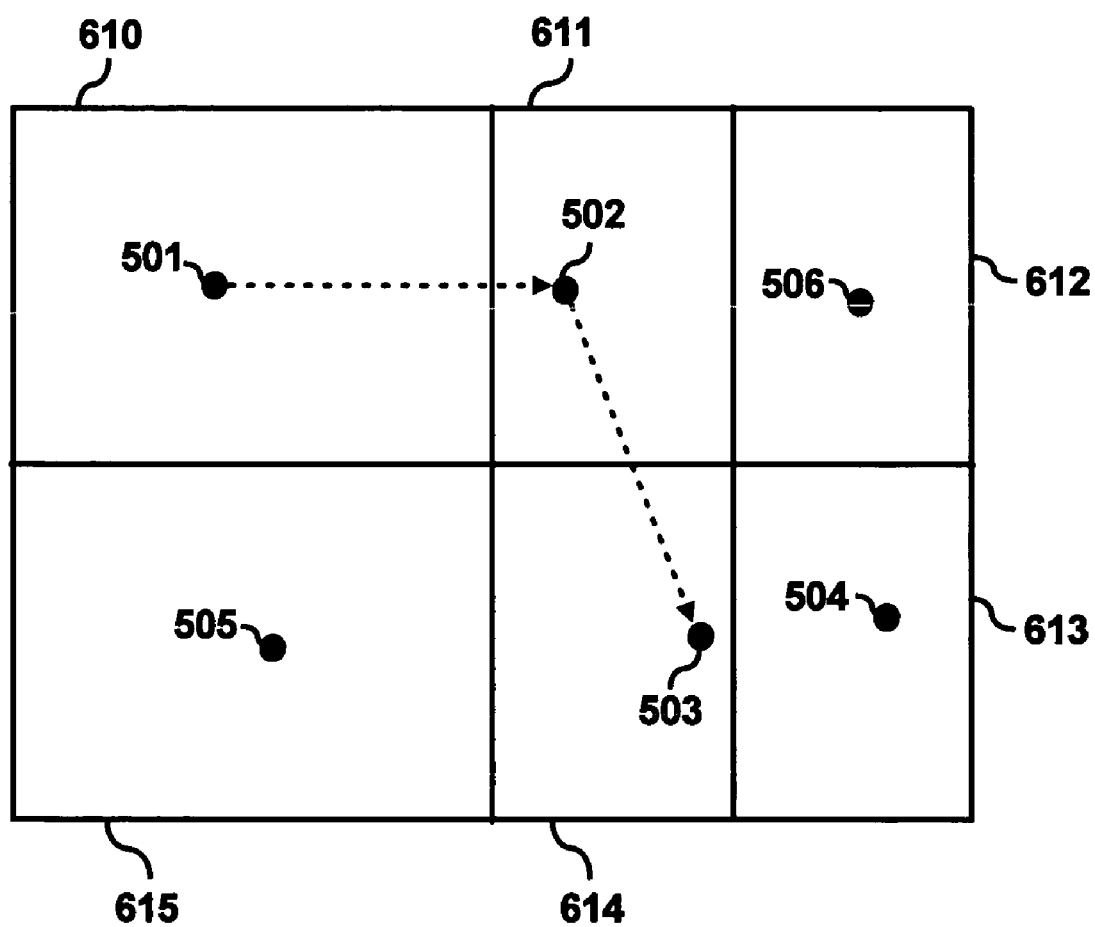
FIG. 6 illustrates an overlay network for the network shown in FIG. 5, according to an embodiment.

FIG. 6 illustrates an example of using location information including distances measured to global landmark nodes and local landmark nodes to identify a closest node for routing. FIG. 6 illustrates an example of a DHT overlay network 600 for the network 500 shown in FIG. 5. The DHT overlay network 600 is illustrated as a CAN overlay network, such as described with respect to FIG. 2, including the nodes 501-506 in regions 610-615, however other types of DHT overlay networks may be used. Location information for the nodes 501-506 is stored in the global information table in the nodes 501-506 in the overlay network 600, such as described with respect to FIGS. 3 and 4. The location information may include landmark vectors including distances to global landmark nodes and local landmark nodes.

The node 501 transmits a message to the node 503 for requesting personalized services, such as the content in German, from the node 503. Because the node 503 is not in a neighboring zone to the zone 610 where the node 501 is located, the node 501 identifies a closest node in a neighboring zone, such as the region 611 for routing to the node 503. To identify a closest node in the zone 611, the node 503 transmits a request to a node in the region 611. The request includes location information, such as a landmark vector, for the node 501. The routing table for the node 501 may include at least one node in the region 611 for transmitting the request. The node in the region 611 receiving the request searches its global information table for a set of candidate nodes in the region 611 that are closest to the node 501 and applies a clustering algorithm to identify a subset of the candidate nodes closest to the node 501. The subset of nodes is transmitted to the node 501.

The node 501 determines distance to each of the subset of candidate nodes and selects a closest node, such as the node 502, for routing. The node 501 may consider factors other than physical location when identifying a node for routing. For example, the node 501 may also evaluate QoS characteristics, which may be stored in the global information table, for the set of candidate nodes. The node 501 may select a closest node having the desired QoS characteristics from the set of candidate nodes. Assuming the node 502 is selected, the node 502 forwards the request for service from the node 501 to the node 503 providing the service.

Figure 7:
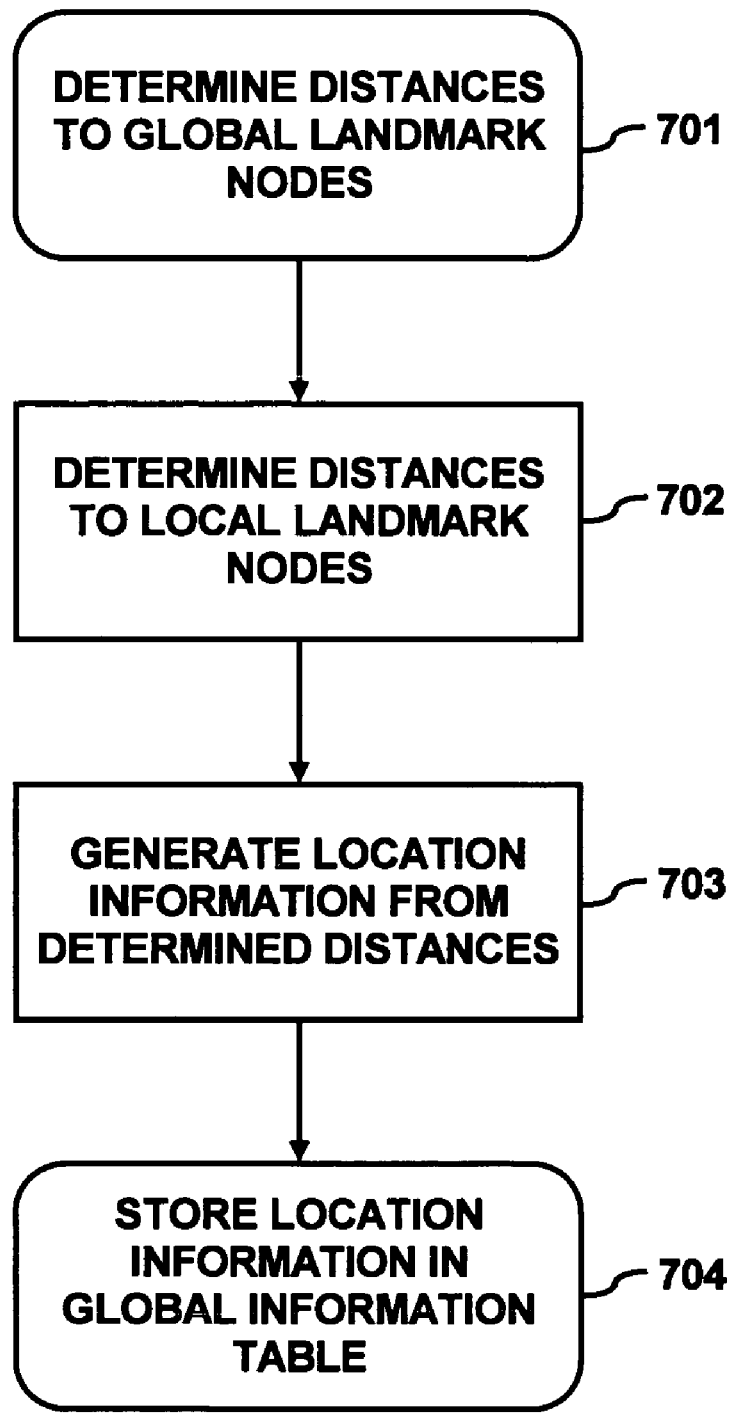
FIG. 7 illustrates a flow chart of a method for determining location information for a node in a network, according to an embodiment.

FIG. 7 illustrates a flow chart of a method for generating location information for nodes, according to an embodiment. FIG. 7 is described with respect to the network 100 shown in FIG. 1 and the overlay network 200 shown in FIG. 2 by way of example and not limitation. At step 701, the node 10 determines distances to the global landmark nodes in the network 100. For example, the node 10 measures distances to the global landmark nodes GL1 and GL2 using RTT or another network metric.

At step 702, the node 10 determines distances to local landmark nodes in proximity to the node 10. This may include the local landmark nodes LL1 and LL4 encountered by a probe packet measuring RTTs to the global landmark nodes GL1 and GL2. In another example, distances to all local landmark nodes within a predetermined distance to the node are determined using the global information table. This may be determined by comparing landmark vectors for nodes. Nodes with landmark vectors having a predetermined similarity are selected from the global information table.

Steps 701 and 702 may be performed together. For example, when the local landmark nodes reside on the routing path, probing the global landmark node gets the distances to the corresponding local landmarks with substantially no messaging overhead. For example, substantially all the routers in the network may be selected as local landmark nodes and traceroute or another similar network utility is used to obtain the distances to global and local landmark nodes on the routing path to the global landmark node. In this example, distance to every router on the routing path may not be measured. For example, a time-to-live field may be utilized, such that distances to only the first predetermined number of routers receiving the probe packet are measured. Alternatively, distances to, for example, the $1^{st}$, $2^{nd}$, $4^{th}$, $8^{th}$, and $16^{th}$ routers are measured. Thus, distances to a number of routers less than the total number of routers on a routing path to a global landmark node may be measured.

At step 703, location information for the node 10 is generated using the distances to the global landmark nodes and the local landmark nodes. For example, a landmark vector is generated for the node 10 including the distances to the global landmark nodes GL1 and GL2 and the distances to the local landmark nodes LL1 and LL4.

At step 704, the node 10 stores its location information, such as its landmark vector, in the global information table. In one example, this includes hashing the global landmark portion of the landmark vector to identify a location in the DHT overlay network 200, shown in FIG. 2, for storing the location information and possibly other information about the node 10, such as services provided, load, forwarding capacity, etc., in the global information table.

Figure 8:
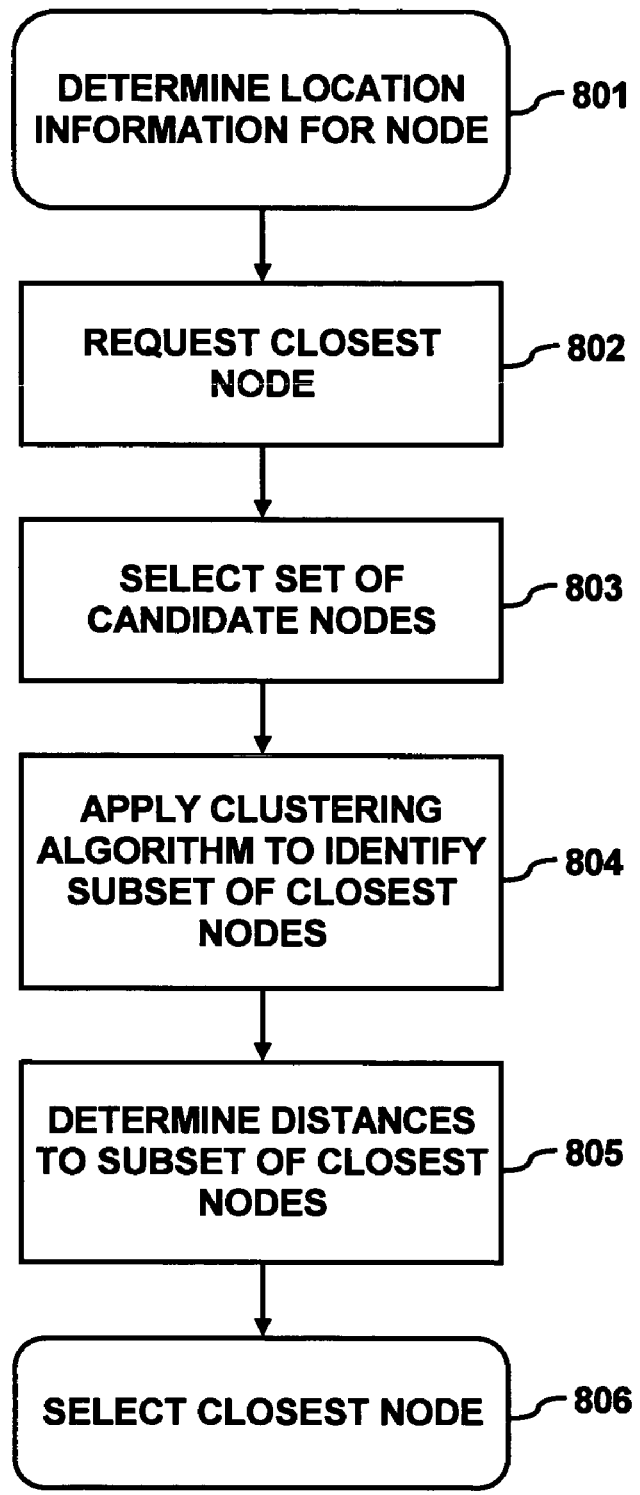
FIG. 8 illustrates a flow chart of a method for determining a closest node to a given node, according to an embodiment.

FIG. 8 illustrates a flow chart of method 800 for identifying a closest node according to an embodiment. FIG. 8 is described with respect to the network 100 shown in FIG. 1 and the overlay network 200 shown in FIG. 2 by way of example and not limitation. At step 801, location information, such as a landmark vector including distances to the global landmark nodes and the proximally located local landmark nodes, is determined for the node 10.

At step 802, the node 10 transmits a request to the DHT overlay network 200 for identifying a closest node to the node 10. For example, the node 10 hashes the global portion of its landmark vector, such as the distances to the global landmark nodes GL1 and GL2, to identify a point in the DHT overlay network 200. The node 10 transmits the request to a node in the DHT overlay network 200 owning the zone where the identified point is located.

At step 803, the DHT overlay network 100 selects a set of candidate nodes closest to the node 10. For example, assume the node 10 transmits the request to the node 50. The node 50 selects a set of candidate nodes closest to the node 10 using the global landmark portion of the landmark vector for the node 10. For example, the node 50 compares the global landmark portion of the landmark vector of the node 10 to the global landmark portions of the landmark vectors for the nodes stored in the global information table residing in the node 50. This may include landmark vectors for nodes in the zone 212 owned by the node 50 and neighbor nodes to the node 50. The landmark vectors or the global portions of the landmark vectors are compared to identify a set of candidate nodes closest to the node 10.

At step 804, the node 50 applies a clustering algorithm to set of candidate nodes to identify a subset of the candidate nodes that are closest to the node 10. For example, the landmark vector of the node 10 is compared to the landmark vectors of the candidate nodes using, for example, one of the clustering algorithms min_sum, max_dif f, order, and inner product.

At step 805, the node 10 receives a list of the subset of candidate nodes from the node 50 determined at the step 804 and determine distances to each of the nodes in the subset of candidate nodes using a network metric, such as RTT or network hops. At step 806, the node 10 selects the closest node from the subset of candidate nodes based on the measured distances.

Factors other than distance may be considered when selecting a network node. For example, if the node 10 is attempting to identify a node in the network 100 that is providing particular data or services, factors related to QoS that can affect the transmission of the data or the delivery of services may be considered. For example, bandwidth, current of load of the node supplying the data or services, and forward capacity of a node may be determined for each of the nodes in the set of candidate nodes. The node 10 selects a node from the candidate set that best meets its needs, such as a closest node that provides the best QoS. Similarly, if the node 10 is identifying a closest node for routing to, for example, a region in an overlay network, bandwidth, forwarding capacity and other factors associated with network routing may be considered when selecting a node from the candidate set of nodes.

Figure 9:
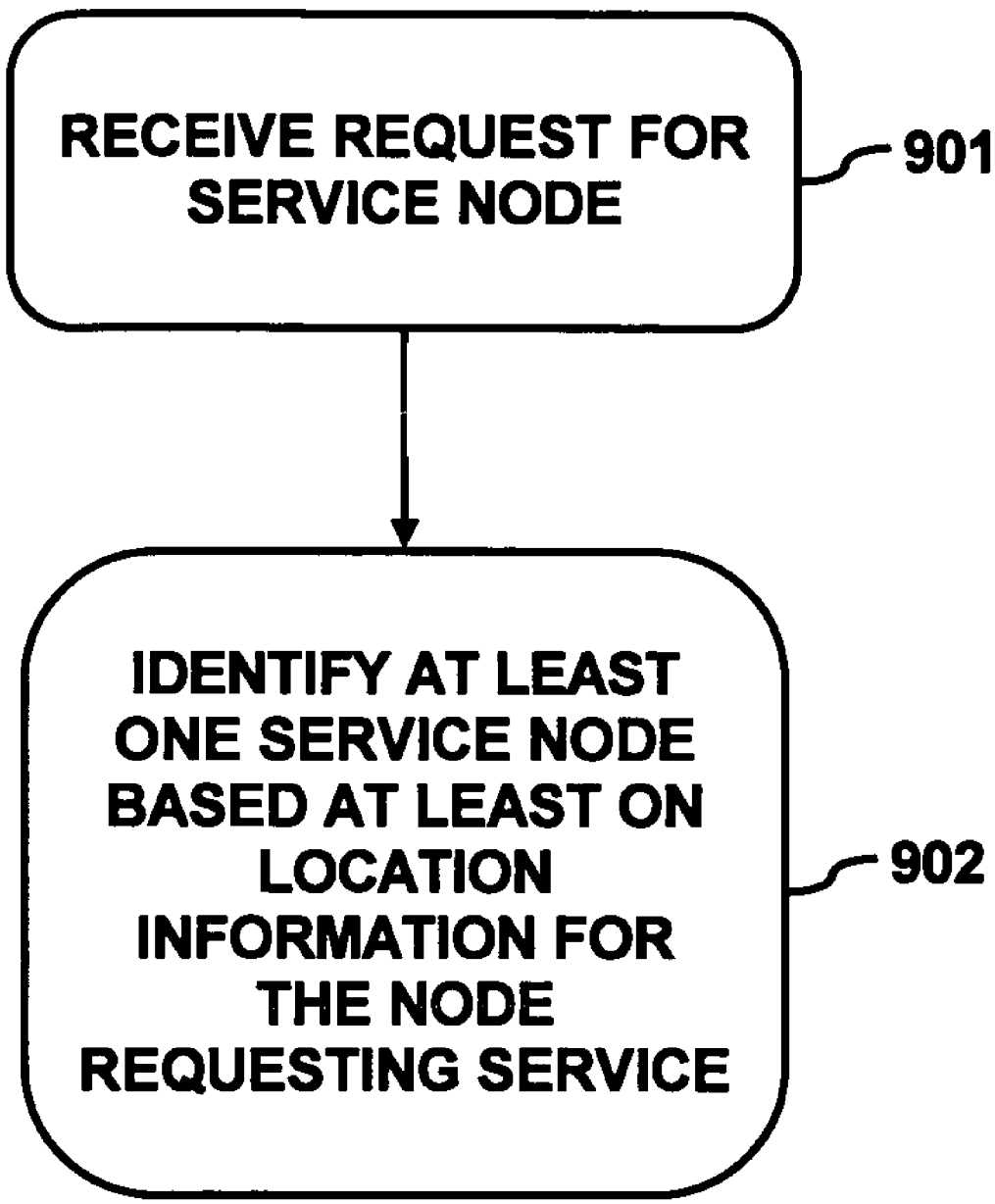
FIG. 9 illustrates a flow chart of a method for identifying at least one service node, according to an embodiment.

FIG. 9 illustrates a flow chart 900 for selecting a service node providing a desired service, according to an embodiment. FIG. 9 is described with respect to the network 500 shown in FIG. 5 by way of example and not limitation. At step 901, the node 502 receives a request for a service node from the node 501 shown in FIG. 5. In one example, the node 501 desires to receive a service comprising the content provided from the node 506 in German. The node 501 submits a request for the service to the DHT overlay network for the network 500 along with its landmark vector. Submitting a request may include hashing the landmark vector or portion of the landmark vector of the node 501 to identify a node in the overlay network and transmitting the request for the desired service to that node, which in this example is the node 502.

At step 902, the node 502 identifies at least one service node in the network 500 that can provide the desired service for the node 501 based at least on location information for the node 501. In one example, the location information includes the landmark vector for the node 501, which is determined as described above with respect to the method 700. The location information for the node 501 may be used to identify nodes physically close to the node 501 in the network 500 that are operable to provide the desired service. For example, the node 501 hashes its landmark vector or a portion of the landmark vector to identify a node, which is the node 502 in this example, storing information in its global information table about nodes physically close to the node 501 in the network 500. The global information table stored at the node 502 is searched to identify at least one service node operable to provide the desired service. The search may be expanded to other nodes, such as described with respect to FIG. 10, if the global information table at the node 502 does not include a service node operable to provide the desired service. Also, if more than one service node operable to provide the desired service is identified, a clustering algorithm, using the location information for the node 501 and the location information for the identified service nodes, may be used to rank the identified service nodes based on an estimation of how close each of the service nodes is to the node. Closeness is associated with the distances measured to determine the landmark vectors for the nodes in the network 500. Distances may be measured as a function of latency, e.g., round-trip-time, number of hops, etc.

Figure 10A:
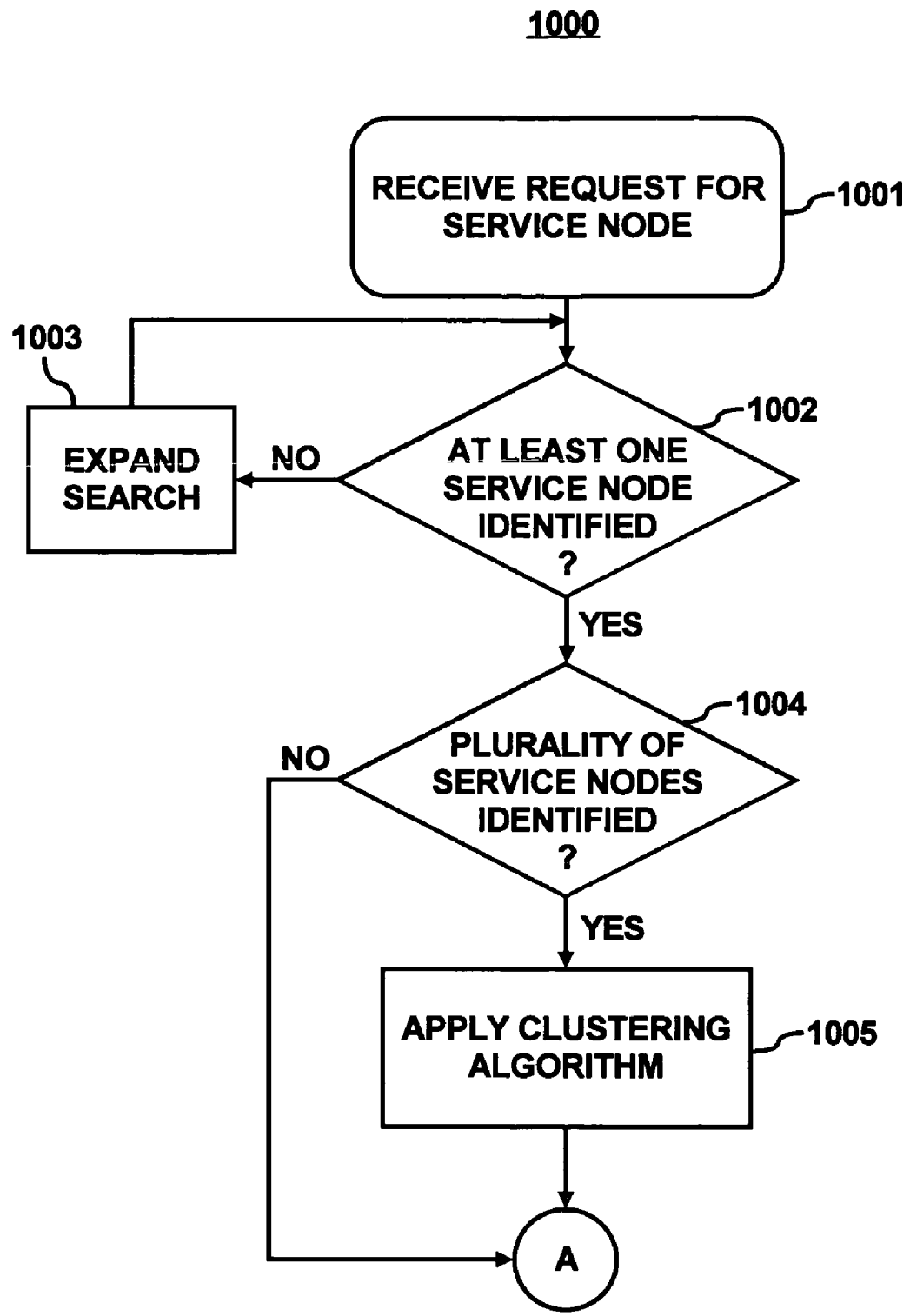
FIGS. 10A-B illustrate a flow chart of a method for identifying at least one service node based on one or more of location information for a node requesting a service and available bandwidth, according to an embodiment.
Figure 10B:
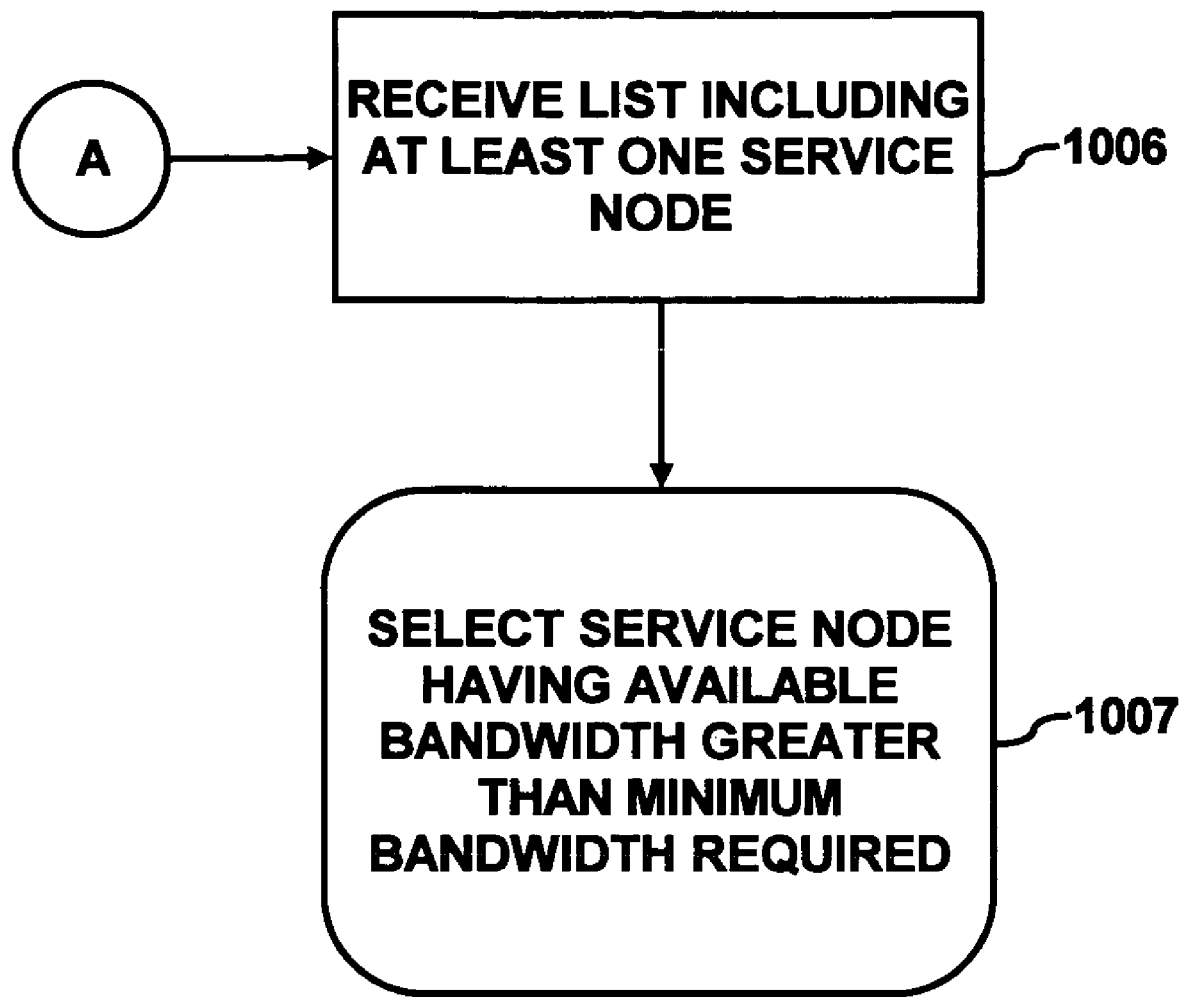

FIGS. 10A-B illustrate a method 1000 according to an embodiment for identifying at least one service node operable to provide a service based on location information and available bandwidth. FIG. 10 is described with respect to the network 500 shown in FIG. 5 by way of example and not limitation. At step 1001, the node 502 receives a request from the node 501 for a service node operable to provide a desired service. In one example, the node 501 desires to receive a service comprising the content provided from the node 506 in German. The node 501 submits a request for the service to the DHT overlay network for the network 500 along with its landmark vector. Submitting a request may include hashing the landmark vector or portion of the landmark vector of the node 501 to identify a node in the overlay network and transmitting the request for the desired service to that node, which in this example is the node 502.

At step 1002, the node 502 determines whether at least one service node operable to provide the desired service can be identified from the global information table stored at the node 502. If no, at step 1003, the search is expanded to the global information table stored in other nodes, such as neighboring nodes to the node 502 in the DHT overlay network for the network 500. Examples of neighboring nodes include the nodes 503 and 506 shown in FIG. 6. If a service node operable to provide the desired service is still not identified, the search may be expanded to neighboring nodes of the neighboring nodes, such as the nodes 504 and 505.

At step 1004, the node 502 determines whether a plurality of service nodes are identified that are operable to provide the desired service. If a plurality of service nodes are identified, then the node 502 applies a clustering algorithm using the location information for the node 501 and the plurality of service nodes at step 1005. The clustering algorithm provides an estimation of how close each of the service nodes are to the node 501. The clustering algorithm may rank the plurality of service nodes. For example, the closest of the plurality of service nodes is ranked highest, the next closest is ranked the next highest, etc.

At step 1006 shown in FIG. 10B, the node 501 receives from the node 502 a list including at least one service node operable to provide the desired service, such as determined by the node 501 at one or more of steps 1002, 1004, and 1005. If a plurality of service nodes were identified at step 1004, the list may be ranked using the clustering algorithm. At step 1007, the node 501 selects one of the plurality of service nodes based at least on available bandwidth being greater than the bandwidth required for the desired service. For example, the list received from the node 502 includes the nodes 503 and 504 operable to provide the desired service. The list indicates the node 503 is closer to the node 501 than the node 504. The node 501 measures available bandwidth between the node 503 and the node 501 using known bandwidth measurement techniques. The node 501 also determines the minimum bandwidth required for the desired service. If the available bandwidth between the node 501 and the node 503 is greater than the minimum bandwidth required, then the node 501 selects the node 503 to provide the desired service. If the available bandwidth is less than the minimum bandwidth required, then the node 501 may select the node 504. If both the node 503 and 504 have available bandwidth less than the minimum required bandwidth, then the service may not be provided to the node 501 or the node 501 may select the node having the greatest available bandwidth. In addition to available bandwidth, the node 501 may consider other factors when selecting a service node from the list. For example, the node 501 may select the service node estimated to be closest to the node 501 and start with that service node when determining whether available bandwidth for that node is greater than the minimum bandwidth required.

In the methods 900 and 1000 location information may be used to identify an initial set of service nodes that are operable to provide a desired service. For example, at steps 901 and 1001, a landmark vector for a node requesting a service may be used to identify service nodes in close proximity to the node requesting the service. It will be apparent to one of ordinary skill in the art that instead of landmark vectors, other types of location information may be used to identify service nodes in close proximity to the node requesting the service. Other types of location proximity techniques, known in the art, may be used to determine the location information, which may then be used to identify an initial set of service nodes in close proximity to the node requesting the service.

The location information may be used to approximate bandwidth between the node requesting the service and the service nodes. For example, it may be assumed that the closer the nodes are to each other, the higher is the available bandwidth between the nodes. After the initial set of service nodes are identified, bandwidth measurements may be performed to identify a service node having enough bandwidth to satisfy the bandwidth requirements for a desired service, such as performed at step 1007.

Figure 11:
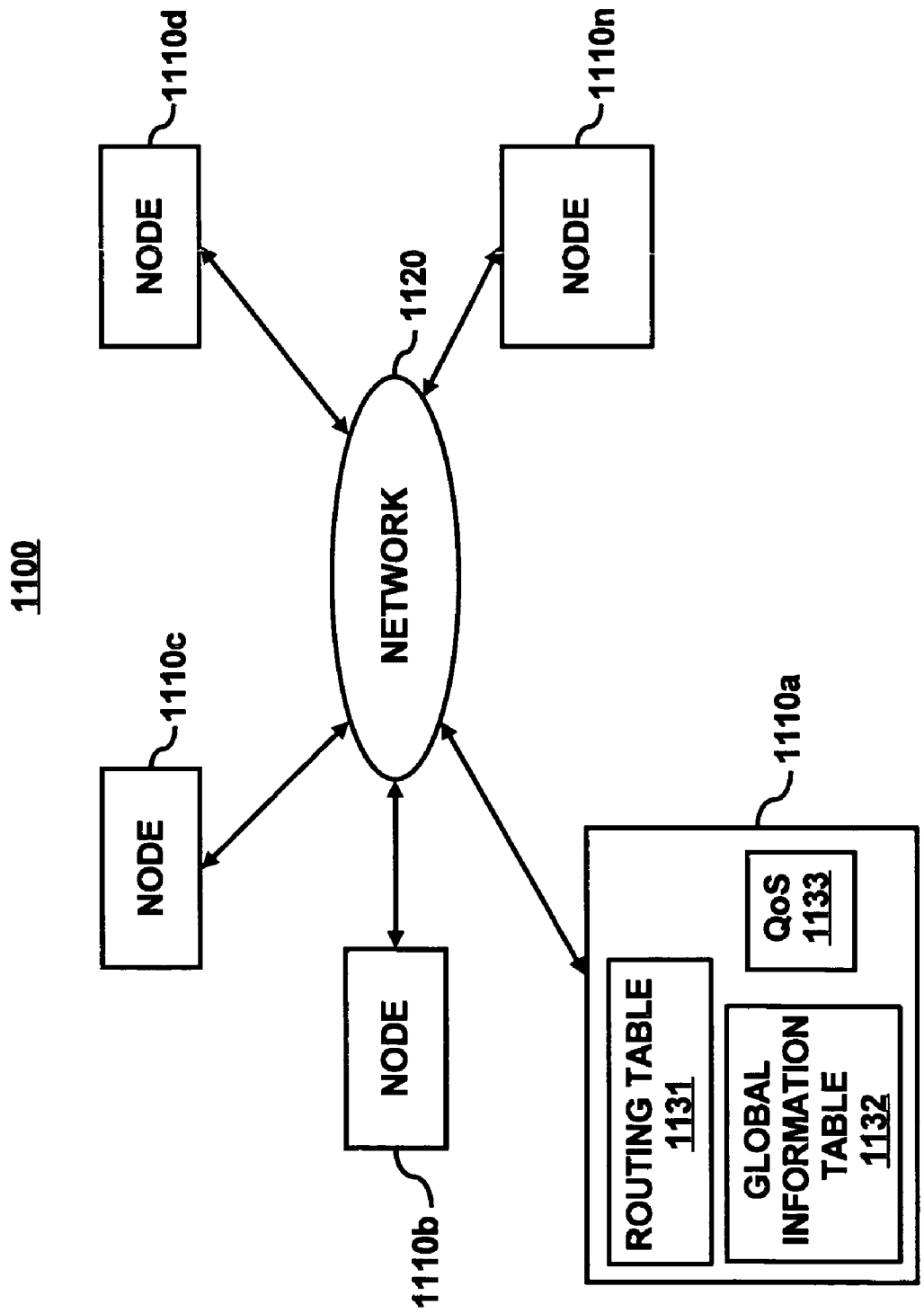
FIG. 11 illustrates a peer-to-peer system, according to an embodiment.

FIG. 11 illustrates a peer-to-peer (P2P) communications model that may be used by the underlying physical network, such as the networks 100 and 500 shown in FIGS. 1 and 5, according to an embodiment of the invention. P2P networks are commonly used as the underlying physical network for DHT overlay networks, such as the CAN DHT overlay networks 200 and 600 shown in FIGS. 2 and 6 respectively. A P2P network 1100 includes a plurality of nodes 1110a . . . 1110n functioning as peers in a P2P system. The nodes 1110a . . . 1110n exchange information among themselves and with other network nodes over a network 1120. The nodes 1110a . . . 1110n may also determine which nodes 1110a . . . 1110n perform other functions of a peer in a P2P system, such as object search and retrieval, object placement, storing and maintaining the global-information table, etc. Objects may include files, URLs, etc. The nodes 1110a . . . 1110n may be computer systems (e.g., personal digital assistants, laptop computers, workstations, servers, and other similar devices) that have a network interface. The nodes 1110a . . . 010n may be further operable to execute one or more software applications (not shown) that include the capability to share information (e.g., data, applications, etc.) in a P2P manner and the capability to operate as nodes in a DHT overlay network.

The network 1120 may be operable to provide a communication channel among the nodes 1110a . . . 1110n. The network 1120 may be implemented as a local area network, wide area network or combination thereof. The network 1120 may implement wired protocols, such as Ethernet, token ring, etc., wireless protocols, such as Cellular Digital Packet Data, Mobitex, IEEE 802.11b, Bluetooth, Wireless Application Protocol, Global System for Mobiles, etc., or combination thereof.

Some of the information that may be stored in the nodes 1110a . . . n is shown for node 1110a. The node 1110a stores a routing table 1131, the global information table 1132, and possibly measured QoS characteristics.

Figure 12:
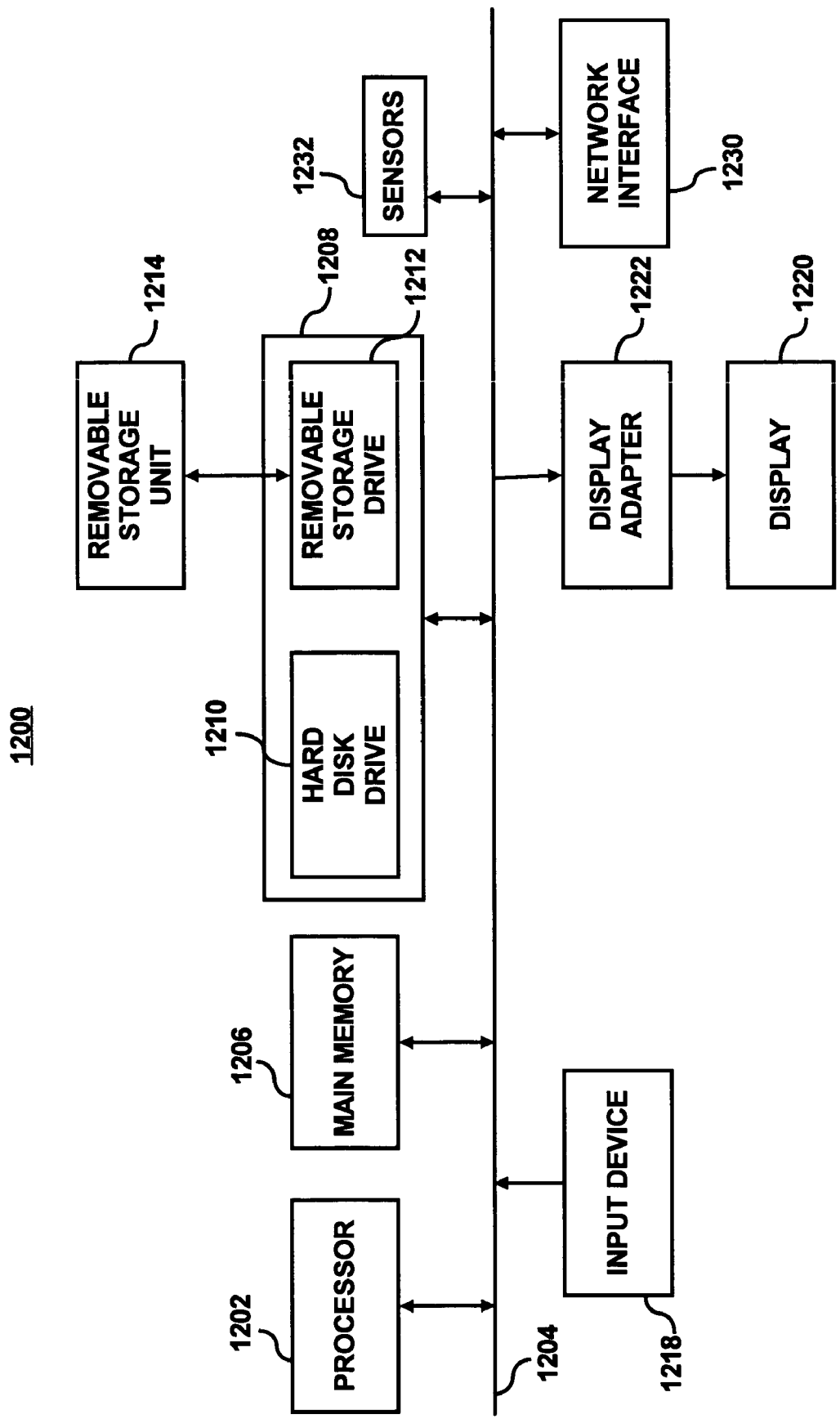
FIG. 12 illustrates a computer system that may operate as a node in the peer-to-peer system shown in FIG. 11, according to an embodiment.
Figure 13:
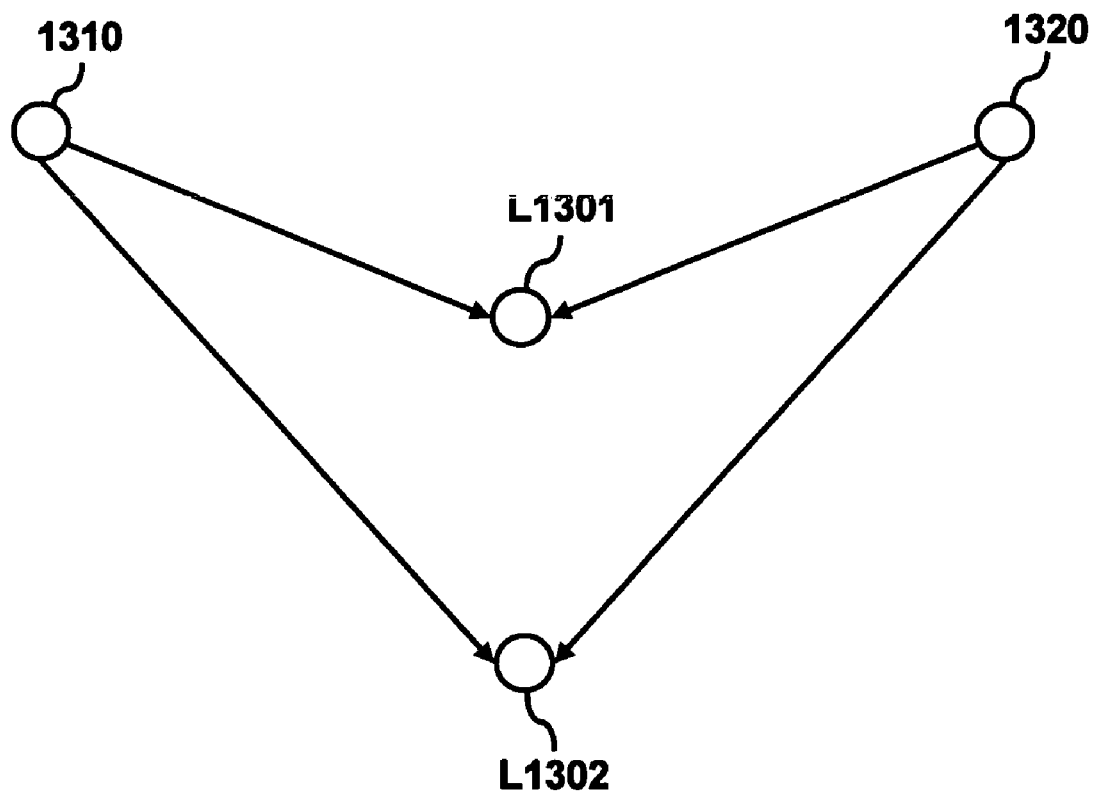
FIG. 13 illustrates a conventional landmark clustering scheme.

FIG. 12 illustrates an exemplary block diagram of a computer system 1000 that may be used as a node in the P2P network 1200 shown in FIG. 11. The computer system 1200 includes one or more processors, such as processor 1202, providing an execution platform for executing software.

Commands and data from the processor 1202 are communicated over a communication bus 1204. The computer system 1200 also includes a main memory 1206, such as a Random Access Memory (RAM), where software may be executed during runtime, and a secondary memory 1208. The secondary memory 1208 includes, for example, a hard disk drive 1210 and/or a removable storage drive 1212, representing a floppy diskette drive, a magnetic tape drive, a compact disk drive, etc., or a nonvolatile memory where a copy of the software may be stored. The secondary memory 1208 may also include ROM (read only memory), EPROM (erasable, programmable ROM), EEPROM (electrically erasable, programmable ROM). In addition to software, routing tables, the global information table, and measured QoS characteristics, measured available bandwidth and bandwidth required for services may be stored in the main memory 1206 and/or the secondary memory 1208. The removable storage drive 1212 reads from and/or writes to a removable storage unit 1214 in a well-known manner.

A user interfaces with the computer system 1200 with one or more input devices 128, such as a keyboard, a mouse, a stylus, and the like. The display adaptor 1222 interfaces with the communication bus 1204 and the display 1220 and receives display data from the processor 1202 and converts the display data into display commands for the display 1220. A network interface 1230 is provided for communicating with other nodes via the network 920 shown in FIG. 9. Also, sensors 1232 are provided for measuring QoS characteristics for the node, which may include forward capacity, load, bandwidth, etc.

One or more of the steps of the methods 700, 800, 900, and 1000 may be implemented as software embedded on a computer readable medium, such as the memory 1006 and/or 1008, and executed on the computer system 1000, for example, by the processor 1202. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

Some example of the steps that may be performed by the software may include steps for determining distances to generate location information. For example, the software instructs the processor 1002 to use other hardware for generating probe packets for measuring RTT to global landmark nodes to determine distance. In another example, the software may generate a request to the global information table for identifying local landmark nodes within a predetermined proximity and measure distances to those local landmark nodes. The software includes instructions for implementing the DHT overlay network and for storing information to the global information table in the DHT overlay network by hashing a landmark vector. Also, some or all of the steps of the method 800 for identifying a closest node may also be performed using software in the computer system 1000. In the methods 900 and 1000, identifying at least one service node may be performed by software. In addition, in the method 900, searching for at least one service node, applying a clustering algorithm, and selecting a service node may also be performed by software.

It will be readily apparent to one of ordinary skill in the art that other steps described herein may be performed by the software. For example, if the computer system 1200, shown in FIG. 12, is selected as a local landmark node, the computer system 1200 may respond to received probe packets by generating an ACK message transmitted back to a node. Thus, the node transmitting the probe packet is able to determine distances to proximally located landmark nodes.

While the embodiments have been described with reference to examples, those skilled in the art will be able to make various modifications to the described embodiments without departing from the true spirit and scope. For example, it will be apparent to one of ordinary skill in the art that the advantages of storing location information as described herein can be applied to many applications, such as information storage, load balancing, congestion control, meeting quality of service (QoS) guarantee, taking advantage of heterogeneity in storage capacity and forwarding capacity, etc. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of identifying at least one service node in a network to provide a desired service for a first node in the network, the method comprising:

receiving a request from the first node for a service node configured to provide a desired service, wherein the first node identifies a node to receive the request using location information for the first node; and identifying at least one service node configured to provide the desired service based at least on the location information for the first node, wherein identifying at least one service node configured to provide the desired service further includes determining whether the at least one service node includes a plurality of service nodes;

in response to the at least one service node including a plurality of service nodes, applying a clustering algorithm to identify one or more of the closest service nodes of the plurality service nodes;

ranking the plurality of service nodes based on the applying of the clustering algorithm; and selecting one of the plurality of service nodes to provide the desired service based on available bandwidth for the one service node being greater than a minimum bandwidth required for providing the service and the one service node being one of the closest service nodes to the first node of the plurality of service nodes.

2. The method of claim 1, further comprising:
measuring available bandwidth between the at least one service node and the first node.

3. The method of claim 2, wherein selecting one of the plurality of service nodes further comprises:
selecting the one of the plurality of service nodes based at least on an estimation of how close each of the plurality of service nodes are to the first node.

4. The method of claim 1, wherein identifying at least one service node operable to provide the desired service further comprises:
determining whether information stored in a second node in the network receiving the request includes information for at least one service node configured to provide the desired service, wherein the information stored in the second node includes information about nodes physically close to the first node in the network; and
expanding a search for a service node configured to provide the desired service to include information stored in at least one other node in the network until at least one service node is identified that is configured to provide the desired service.

5. The method of claim 1, wherein location information for the nodes in the network is stored in a distributed hash table (DHT) overlay network, such that location information for nodes physically close in the network is stored in a node in the DHT overlay network or a plurality of nodes close in the DHT overlay network.

6. The method of claim 5, wherein the location information for the nodes is stored in a global information table in the DHT overlay network 7. The method of claim 1, further comprising:
measuring distances from the lint node to a plurality of global landmark nodes and at least one local landmark node proximally located in the network to the first node; and
determining the location information for the first node based on the measured distances.

8. A node in a network comprising:
means for receiving from a first node a request for a service node configured to provide a desired service, wherein the first node identifies a node to receive the request using location information for the first node; and
means for identifying at least one service node configured to provide the desired service based at least on the location information for the first nodes,
wherein the means for identifying identifies at least one service node configured to provide the desired service by
determining whether the at least one service node includes a plurality of service nodes;
in response to the at least one service node including a plurality of service nodes, applying a clustering algorithm to identify one or more of the closest service nodes of the plurality service nodes;
ranking the plurality of service nodes based on the applying of the clustering algorithm; and
selecting one of the plurality of service nodes to provide the desired service based on available bandwidth for the one service node being greater than a minimum bandwidth required for providing the service and the one service node being one of the closest service nodes to the first node of the plurality of service nodes.

9. The node of claim 8, wherein
the plurality of service nodes are ranked based on an estimation of how close each of the plurality of service nodes are to the first node.

10. A computer system configured to connect to a peer-to-peer network and configured to function as a distributed hash table (DHT) node in a DHT overlay network, the distributed hash table overlay network being a logical representation of the peer-to-peer network, wherein the computer system comprises:
a memory configured to store location information for a plurality of nodes in the peer-to-peer network that are physically close to a first node in the network; and
a processor configured to identify at least one service node configured to provide a desired service for the first node by
determining whether the at least one service node includes a plurality of service nodes;
in response to the at least one service node including a plurality of service nodes, applying a clustering algorithm to identify one or more of the closest service nodes of the plurality service nodes;
ranking the plurality of service nodes based on the applying of the clustering algorithm; and
selecting one of the plurality of service nodes to provide the desired service based on available bandwidth for the one service node being greater than a minimum bandwidth required for providing the service and the one service node being one of the closest service nodes to the first node of the plurality of service nodes.

11. The computer system of claim 10, wherein the location information for the plurality of nodes comprises distances measured from each of the plurality of nodes to a plurality of global landmark nodes and to at least one local landmark node proximally located to a respective one of the plurality of nodes.

12. Computer software embedded on a tangible computer readable storage medium, the computer software comprising instructions performing:
receiving a request from a first node for a service node configured to provide a desired service, wherein the first node identifies a node to receive the request using location information for the first node; and
identifying at least one service node configured to provide the desired service based at least on the location information for the first node,
wherein identifying at least one service node configured to provide the desired service further includes
determining whether the at least one service node includes a plurality of service nodes;
in response to the at least one service node including a plurality of service nodes, applying a clustering algorithm to identify one or more of the closest service nodes of the plurality service nodes;
ranking the plurality of service nodes based on the applying of the clustering algorithm; and
selecting one of the plurality of service nodes to provide the desired service based on available bandwidth for the one service node being greater than a minimum bandwidth required for providing the service and the one service node being one of the closest service nodes to the first node of the plurality of service nodes.

* * * * *

UNITED STATES PATENT AND TRADEMARK OFFICE
CERTIFICATE OF CORRECTION

PATENT NO. : 7,644,167 B2  Page 1 of 1
APPLICATION NO. : 10/960605
DATED : January 5, 2010
INVENTOR(S) : Sung-Ju Lee et al.

It is certified that error appears in the above-identified patent and that said Letters Patent is hereby corrected as shown below:

In column 5, line 27, after "node" insert -- 20 --.

In column 19, line 37, in Claim 6, delete "network" and insert -- network. --, therefor.

In column 19, line 39, in Claim 7, delete "lint" and insert -- first --, therefor.

In column 19, line 52, in Claim 8, delete "nodes," and insert -- node, --, therefor.

Signed and Sealed this

Twenty-sixth Day of October, 2010

David J. Kappos
*Director of the United States Patent and Trademark Office*